No. 738,281. PATENTED SEPT. 8, 1903.
W. T. BELL.
ILLUMINATED CLOCK.
APPLICATION FILED NOV. 12, 1901.
NO MODEL. 7 SHEETS—SHEET 1.

No. 738,281. PATENTED SEPT. 8, 1903.
W. T. BELL.
ILLUMINATED CLOCK.
APPLICATION FILED NOV. 12, 1901.
NO MODEL. 7 SHEETS—SHEET 3.

Witnesses Inventor
William T. Bell
By Wm. E. Boulter,
Attorney

No. 738,281. PATENTED SEPT. 8, 1903.
W. T. BELL.
ILLUMINATED CLOCK.
APPLICATION FILED NOV. 12, 1901.
NO MODEL. 7 SHEETS—SHEET 4.

Witnesses
Inventor
William T. Bell,
Attorney

No. 738,281. PATENTED SEPT. 8, 1903.
W. T. BELL.
ILLUMINATED CLOCK.
APPLICATION FILED NOV. 12, 1901.
NO MODEL. 7 SHEETS—SHEET 5.

No. 738,281. PATENTED SEPT. 8, 1903.
W. T. BELL.
ILLUMINATED CLOCK.
APPLICATION FILED NOV. 12, 1901.
NO MODEL. 7 SHEETS—SHEET 6.
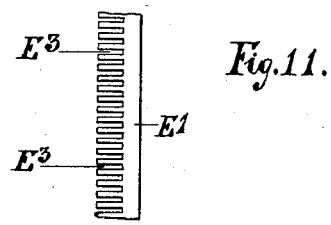
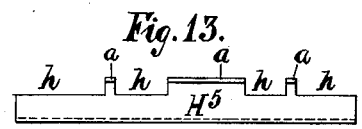
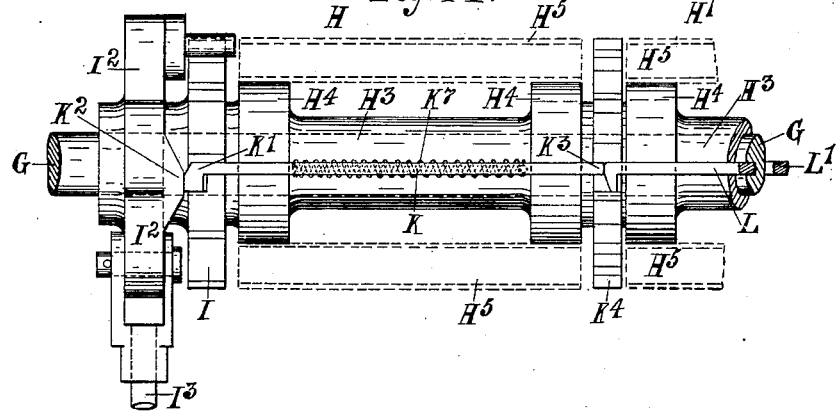
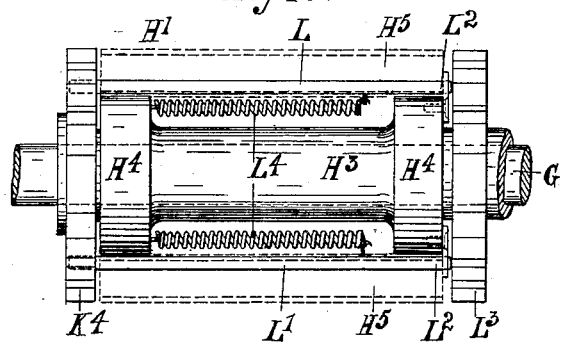

No. 738,281. PATENTED SEPT. 8, 1903.
W. T. BELL.
ILLUMINATED CLOCK.
APPLICATION FILED NOV. 12, 1901.
NO MODEL. 7 SHEETS—SHEET 7.

No. 738,281. Patented September 8, 1903.

UNITED STATES PATENT OFFICE.

WILLIAM THOMSON BELL, OF WEST BRIDGFORD, ENGLAND.

ILLUMINATED CLOCK.

SPECIFICATION forming part of Letters Patent No. 738,281, dated September 8, 1903.

Application filed November 12, 1901. Serial No. 81,975. (No model.)

*To all whom it may concern:*

Be it known that I, WILLIAM THOMSON BELL, residing at West Bridgford, in the county of Nottingham, England, have invented certain new and useful Improvements in Apparatus for Indicating the Time or for Exhibiting Letters, Words, or Figures for other Purposes, (for which application has been made in Great Britain under No. 7,608, dated the 13th day of April, 1901,) of which the following is a specification.

This invention relates more particularly to improved apparatus for indicating the time in illuminated figures, said figures being formed by selecting and illuminating certain spaces in a series of spaces of which any may be illuminated independently of the remainder. The apparatus may also be used for indicating letters, words, or figures, or a combination of the same for other purposes.

The invention will be best understood by reference to the accompanying drawings, in which—

Figure 1:
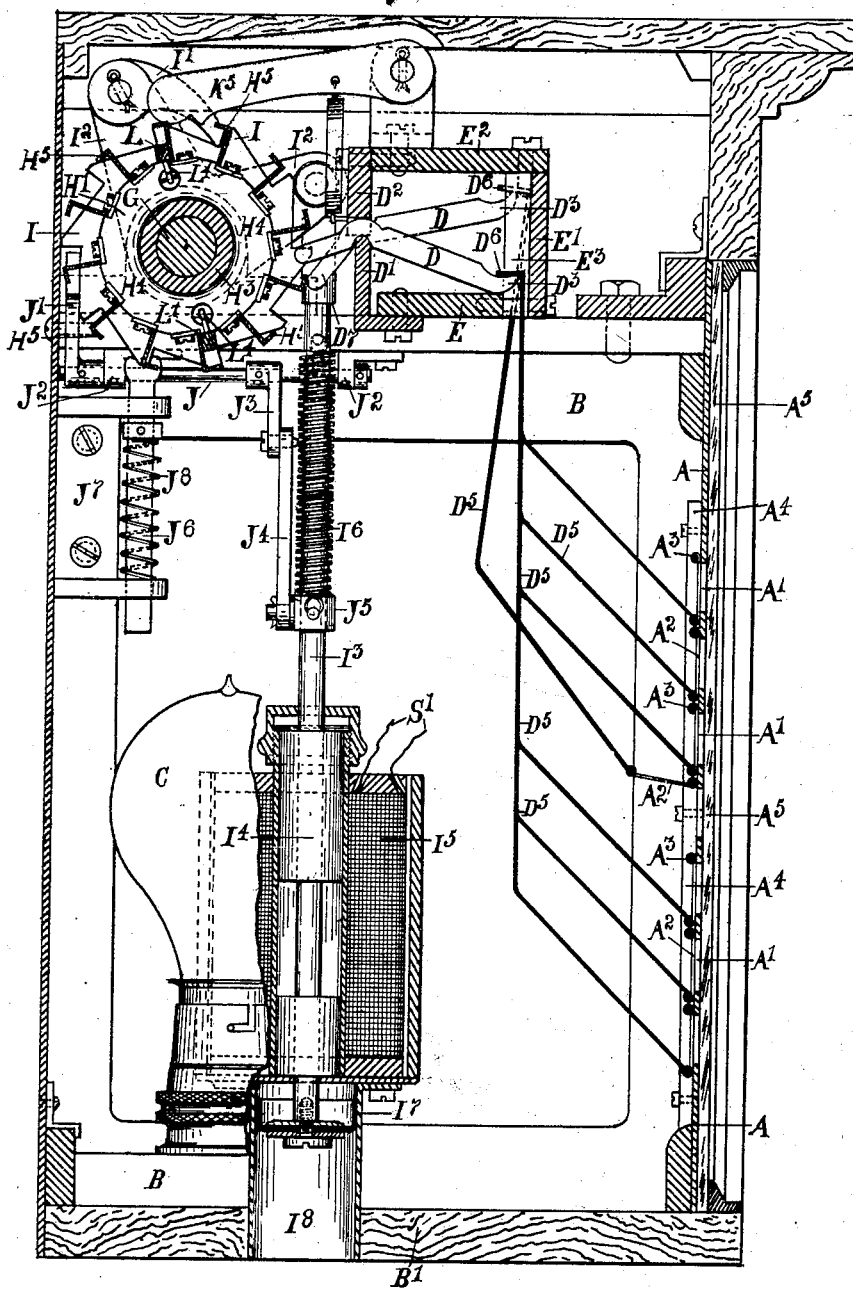
Figure 2:
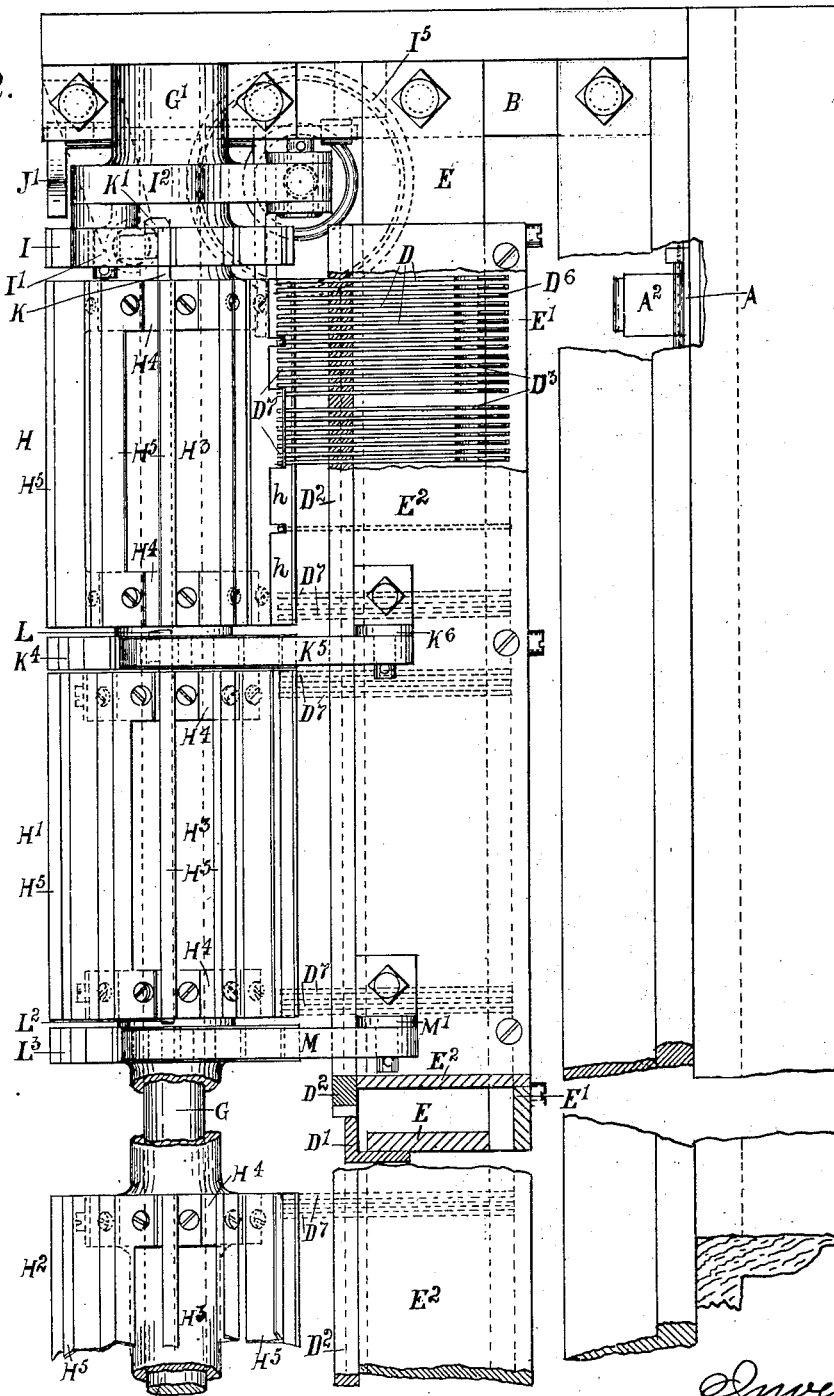
Figure 3:
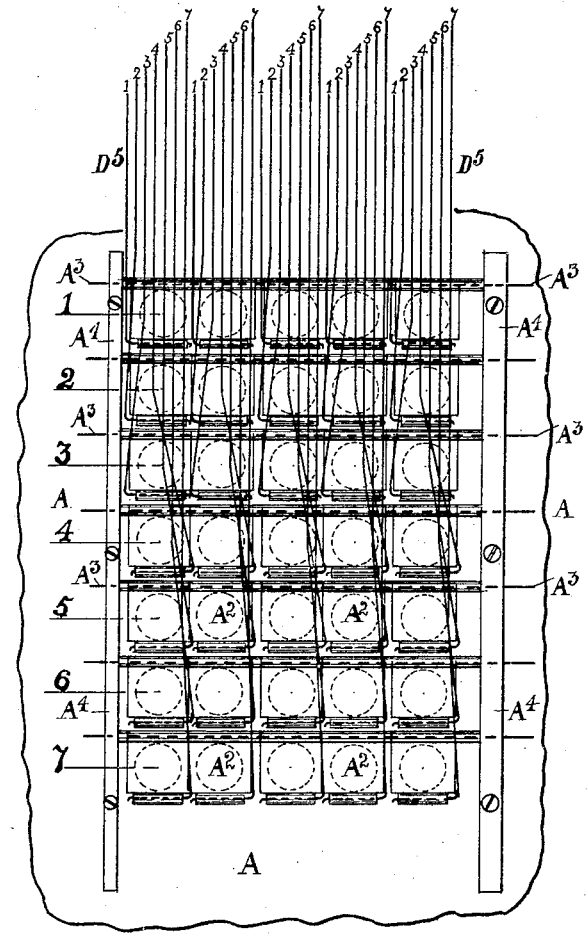
Figures 4, 5:
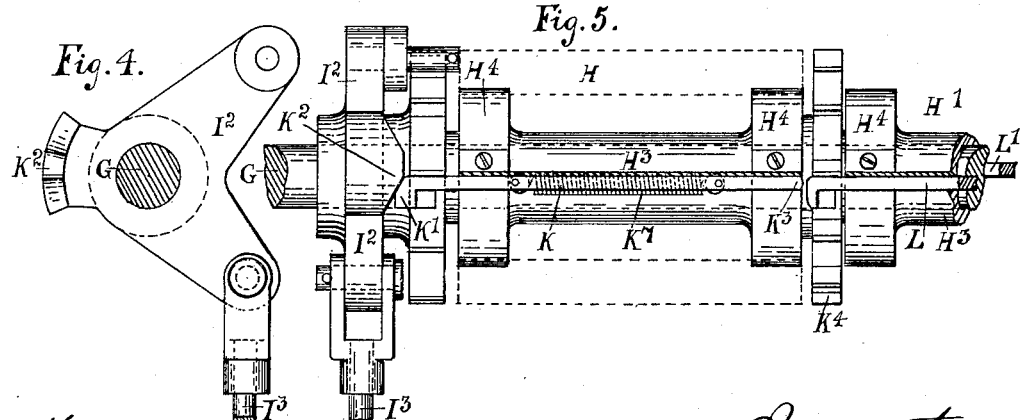
Figure 6:
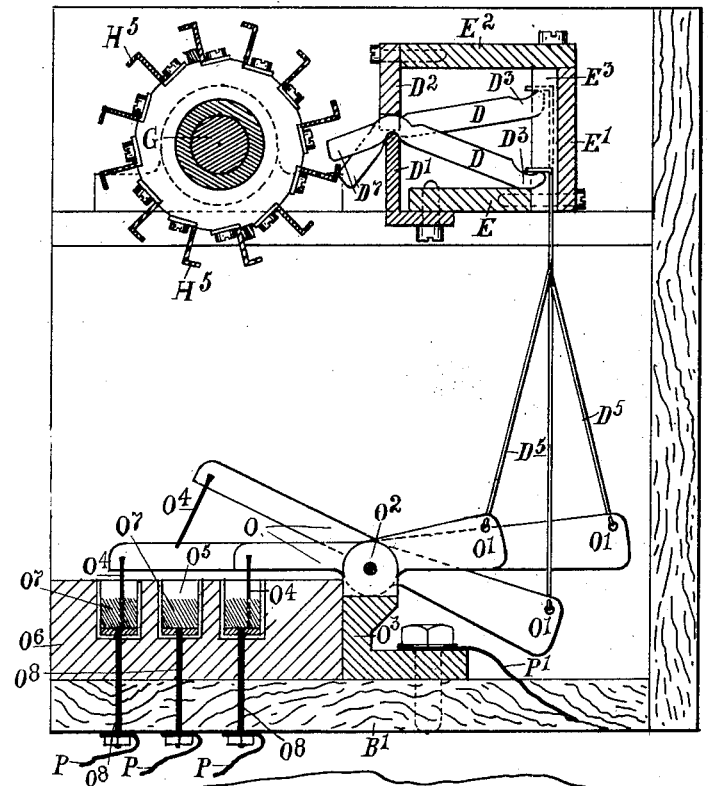
Figure 7:
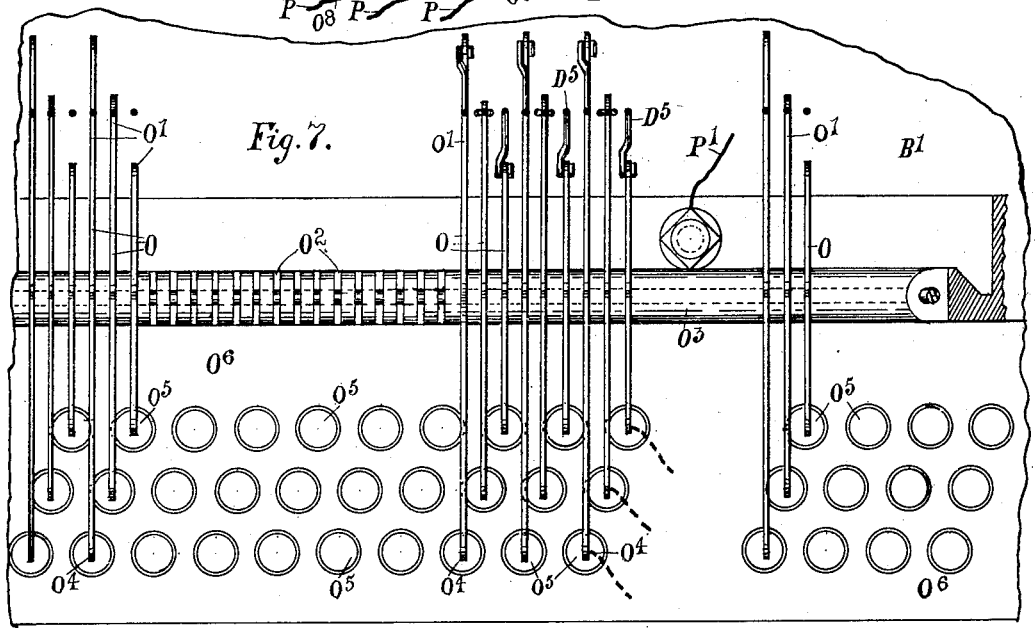
Figure 8:
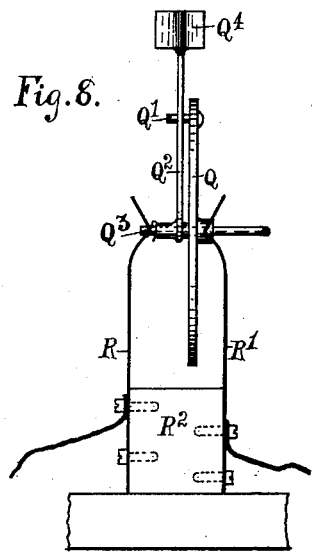

Figure 1 is a vertical cross-section, and Fig. 2 a plan, partly in section, of apparatus constructed according to my invention. Fig. 3 is a rear view of part of the screen or front of the apparatus. Fig. 4 is an end view, and Fig. 5 a view looking from the under side of part of the mechanism for intermittently advancing the selecting-drums. Fig. 6 is a vertical cross-section showing the apparatus arranged to be used in connection with electric lamps. Fig. 7 is a plan of the electrical contacts shown in Fig. 6. Fig. 8 is a side elevation, and Fig. 9 a front elevation, of the clock-actuated switch mechanism for controlling the apparatus. Fig. 10 is a view illustrating the disposition of the spaces which may be independently illuminated and the mode of producing the figures or letters. Fig. 11 is a plan showing a short length of the guide-bar for the selecting levers. Fig. 12 is an end view, and Fig. 13 is a plan, of one of the selecting-bars. Fig. 14 is a similar view of the first selecting-drum to that shown in Fig. 5, illustrating the operations of the mechanism for advancing the second and third drums. Fig. 15 is a plan of the second selecting-drums.

Like characters of reference indicate similar parts throughout the drawings.

In order to indicate the time of the day in illuminated figures as described and which change, say, every minute, I provide a series of spaces, which may be illuminated either by employing an opaque screen provided with a series of openings each fitted with a shutter and a light behind the screen or a series of incandescent electric lamps arranged in spaces in the front of a screen or foundation-framing. In the former case the necessary figures are exhibited by selecting and raising the shutters of the requisite openings in the screen and in the latter case by selecting and switching in the requisite lamps, the selecting and operating mechanism being in both cases identical.

In Figs. 1 and 2 the opaque screen or front A hereinbefore referred to comprises part of the apparatus and is connected to the end framings B of the same. It is formed with a series of openings $A'$, which are preferably disposed in horizontal and vertical lines, as shown in Fig. 10.

Each opening $A'$ (see Figs. 1 and 2) in the screen A is closed by a shutter $A^2$, situated on the interior of the screen, said shutters being each hinged above its opening, preferably on horizontal wires $A^3$, extending the full length of the screen, said wires $A^3$ being held in position by vertical bars $A^4$, secured to the back of the screen, as shown.

At the back of the screen A is a light or series of lights C, (see Fig. 1,) so that by raising the shutters $A^2$ of certain openings, which are selected according to their respective positions in the series, figures or letters may be indicated in endless variety, said figures being made or built up of a number of independent illuminated spaces. For example, as shown in Fig. 10 the spaces which are illuminated are filled in, and it will be seen that the time clearly indicated is 10:24. The screen A may be protected by a plate of glass $A^5$, (see Fig. 1,) which is preferably roughened, or other transparent or semitransparent substance may be employed for this purpose.

The shutters $A^2$ are selected and raised by the following mechanism: Above the screen A are a number of levers D, (see Figs. 1 and 2,) the whole of which are fulcrumed side by side on the upper rounded edge of a horizontal bar $D'$, the levers D being each formed with a notch to fit on said bar $D'$. The latter is arranged parallel to the screen A and is secured to a longitudinal foundation-bar E, the ends of which latter are secured to the end framings B. The levers D are retained in position on the bar D' by a longitudinal cap D², placed above the latter. This cap D² is provided with vertical recesses—that is, one to receive each lever, so that said cap not only prevents the levers from leaving the bar, but also holds them each in a vertical plane at right angles to the bar D' and equidistant one from the other along the length of the said bar. The outer and longer ends D³ of the levers D also work in recesses E³ in a vertical guide-bar E', which is also secured to the longitudinal bar E. The cap D², previously described, is secured to and held in position by means of a longitudinal bar E², which is in turn secured to the vertical guide-bar E'. The outer and longer ends D³ of the levers D are each connected by a connecting-wire D⁵ to the lower end of one of the shutters A². The lower ends of these wires are preferably hinged to the lower part of the respective shutters A², while their upper ends D⁶ are hooked or turned at right angles to the main part, as shown in Fig. 1. The upper bent end D⁶ of each wire is placed in the same recess E³ in the guide-bar E' as the end D³ of the corresponding lever D, the bent part D⁶ being placed on the end D³ of the lever, as shown, and is retained in this position by the walls of the recess E³, (see Fig. 11,) in which the parts are situated.

The order in which the shutters A² are preferably connected to the levers D is illustrated in Fig. 3, in which it will be seen that the seven shutters A² comprising each vertical row are connected to seven consecutive levers D immediately above each of said rows. The inner and shorter ends D⁷ of the levers D are depressed in order to raise their outer ends D³ and the shutters A² through the intermediary of the wire connections D⁵ by the following arrangement: At the back of the levers D (see Figs. 1 and 2) is a longitudinal shaft G, which is placed parallel to the bar D' to which the levers D are fulcrumed. This shaft is preferably fixed and is carried in bearings G', (see Fig. 2,) secured to the end framings B. Mounted loosely on this shaft side by side are preferably three selecting-drums H, H', and H². (See Fig. 2.) Each of these selecting-drums is comprised of a sleeve H³, having flanges H⁴ at its ends, on which latter are secured selecting-bars H⁵, said bars being disposed parallel to the shaft G and equidistant from each other.

The selecting-bars H⁵ may be of the section shown in Fig. 12, and their outer turned edges a and parts of the web are cut away or formed with gaps at certain points in their length, as shown at h in Figs. 2 and 13, so that as the selecting-drums H H' H² are intermittently advanced and the selecting-bars H⁵ on each drum are in turn brought into position to act on the ends D⁷ of the levers D the outer ends D⁷ of those levers which correspond to the position of the gaps h in the selecting-bar H⁵ which is for the time being in operation will be missed, and said levers will remain inoperative while the ends D⁷ of the remainder are depressed and held in this position until the drum is again advanced. Each selecting-bar H⁵ may thus be cut or adapted to operate any of the levers D, arranged along its length, and exhibit by raising the requisite shutters any figure or letter. The first drums H are provided with ten of these selecting-bars H⁵, said bars being respectively cut so as to exhibit by raising the requisite shutters the figures from one up to nine, followed by a naught. These selecting-bars H⁵ are arranged on the drum H to exhibit said figures in the proper order or sequence as said drum is intermittently advanced. This first selecting-drum H is utilized to indicate units of minutes and is advanced one-tenth of a revolution every minute, preferably by the following electrically-operated arrangement:

Secured on the end of the selecting-drum H (see Figs. 1 and 2) is a ratchet-wheel I, provided with ten teeth, which are each in turn engaged by a pawl I', carried on one end of a bell-crank lever I², which latter is mounted loosely on the shaft G. The other end of the bell-crank lever I² is connected by a rod I³ (see Fig. 1) to a soft-iron core I⁴ within a solenoid I⁵, secured to the base B' of the casing. The core I⁴ is drawn downward and the drum H advanced through the intermediary of the pawl mechanism described by passing a current of electricity through the solenoid I⁵, said current being controlled by a switch, hereinafter described, operated by a clock. The core I⁴ is returned to its normal position again when the current is cut off by a spring I⁶, mounted on the rod I³ and connected to the said rod and end framing B, respectively. In order to steady the action of this spring I⁶, the lower end of the rod I³ is carried right through the solenoid and is provided with a piston I⁷, working in a cylinder I⁸ on the under side of the solenoid and arranged to constitute a dash-pot.

The drum H is prevented from overrunning by an arm J' (see Fig. 1) on a rocking shaft J, carried in bearings J², secured to the end framing B. The end of this arm J' is moved into the path of the teeth of the ratchet-wheel I and engages with one of said teeth on the completion of each movement, as follows: The rocking shaft J is provided with a second arm J³, the outer end of which is connected by a link J⁴ and bracket J⁵ to the rod I³ of the iron core I⁴. The downward movement of the latter thus both advances the ratchet-wheel I and the selecting-drum H, to which it is secured, and simultaneously moves the arm J' into engagement with a tooth of the wheel I in order to stop the drum in the exact position. The drum H is prevented from running back by a sliding bolt J⁶, mounted in a bracket J⁷, secured to the framing B. This bolt J⁶ is provided with a notch in its upper end to engage with the points of the teeth of the ratchet-wheel I and with a spring J⁸, mounted thereon, to move it into engagement with the said teeth.

The second selecting-drum H' is used to indicate tens of minutes, and it is provided with twelve selecting-bars H⁵. These bars are cut and arranged in the requisite order to exhibit the figures "1," "2," "3," "4," "5," "0" and then repeat, as after indicating fifty-nine minutes the hour is indicated by the third selecting-drum, and the two-minute indicating-drums cause naughts to be exhibited and recommence at one again. This second selecting-drum H' is advanced one-twelfth of a revolution every complete revolution of the first drum H. This is effected by the following arrangement.

Mounted in openings in the end flanges H⁴ and the ratchet-wheel I of the first drum H is a longitudinal bolt K, (see Figs. 2, 4, 5, and 14,) placed parallel to the axis of the drum. When the latter has made a complete revolution, the outer end K' of the bolt is engaged by a cam-surface K² (see Figs. 4 and 5) on the inner side of the boss of the bell-crank lever I², and the said bolt is moved endwise by the cam-surface K² as the lever returns to its normal position again after advancing the drum H. When the bolt is moved endwise, as described, its inner end K³ engages with one of the teeth of a twelve-toothed ratchet-wheel K⁴, secured to the drum H', as shown in Fig. 14, and the latter is thus advanced one-twelfth of a revolution the next time the first drum H is advanced. The bolt K is then released and is returned to its normal position again by a spring K⁷, when the bell-crank lever returns to its normal position again.

The selecting-drum H' is prevented from running back by a spring-actuated stop-pall K⁵, (see Fig. 2,) pivoted to a bracket K⁶, secured on the bar E², engaging with the teeth of the ratchet-wheel K⁴.

The third selecting-drum H² is employed to indicate the hours and is provided with twelve selecting-bars cut and distributed so as to exhibit the figures "1" to "12" in regular order or sequence. This drum H² is advanced one-twelfth of a revolution every half-revolution of the second drum H'—that is, every time the latter causes the figure "0" to be exhibited. For this purpose the second drum H' is provided with two longitudinal bolts L L', (see Figs. 1 and 5,) corresponding to the bolt K in the first drum H, said bolts being arranged one diametrically opposite to the other. One of these bolts, L or L', in the second drum H' will be in the same operative position as the bolt K in the first drum H every half-revolution of the former, and the said bolt, L or L', is then moved endwise by the bolt K, as shown in Fig. 14, so that the end L² of the former engages with one of the teeth of a twelve-toothed ratchet-wheel L³, secured to the drum H², and advances the latter one-twelfth of a revolution, said bolt L or L' being then returned to its normal position again simultaneously with the bolt K by a spring L⁴. (See Figs. 1 and 14.) When the drum H' has completed another half-revolution, the other bolt will correspond with and be moved endwise by the bolt K and will again advance the drum H² another twelfth of a revolution and cause the figures indicative of the next hour to be exhibited. The drum H² is prevented from running back by a second spring-actuated stop-pawl M, (see Fig. 2,) pivoted on a bracket M', secured to the bar E², engaging with the teeth of the ratchet-wheel L³ on the said drum.

The whole of the apparatus described is preferably inclosed in an opaque casing, so that no light reaches the observer save that emitted through those openings A' in the screen A which have their shutters raised for the time being.

Figure 16:
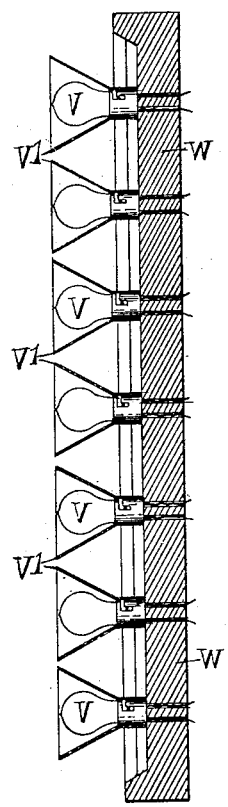
Figure 17:
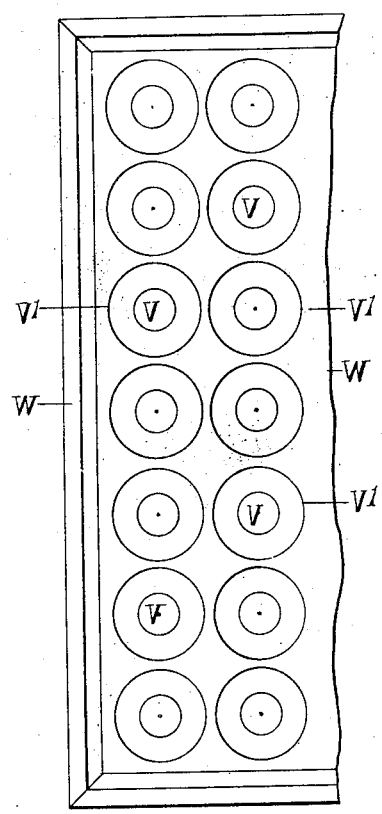

When a series of incandescent lamps are employed, they are arranged on a suitable foundation in the same order as shown in Fig. 10, and each lamp is independently switched in or out of circuit by means of a contact maker and breaker in the circuit of each lamp, operated by the mechanism hereinbefore described. Figs. 16 and 17 show how the electric lamps are arranged to produce the desired result. The lamps V are in this case secured to a framing on foundation W in the requisite order, and each lamp is preferably provided with a conical reflector V', as shown. The levers D (see Figs. 6 and 7) are in this case each connected to the outer ends O' of one of a series of contact-levers O by means of the wires D⁵. These contact-levers O are pivoted in transverse recesses O², formed in a longitudinal bar O³, secured to the base B'. The inner end of each contact-lever is provided with a pin O⁴, which when its outer end O' is raised dips into one of a series of corresponding cells O⁵, the whole of which may be formed in a block O⁶ of insulating material and are situated under the pins O⁴ of the levers O. The whole of the cells O⁵ are partially filled with mercury O⁷, and said mercury is electrically connected to the under side of the block O⁶ by means of a bolt O⁸, (see Fig. 6,) passing through the base of each of the cells. One terminal of each of the lamps is connected by means of conductors P, attached to the bolts O⁸, to one of the cells O⁵, and the other terminals to one pole of the generator. The other pole of the generator is connected by a conductor P' to the longitudinal bar O³, in which the contact-levers O are pivoted, so that when the pins O⁴ of any of the latter are caused to dip into their corresponding mercury-cells O⁵ the lamps connected to those cells will have their circuits closed and will be illuminated, while the reverse action breaks the circuits. Precisely the same result will by these means be obtained as with the perforated screen provided with shutters; but in this case the lamps may be disposed any distance from the operating mechanism, and the former may thus be of considerable size and be disposed on the exterior of a building and the latter be situated in the interior.

In order to prevent sparking at the mercury contacts described, a contact maker and breaker of similar construction to the above may be situated in the main conductor P' and be operated by a lever actuated by projections on a cam connected to the first selecting-drum H, said cam being arranged to break the main circuit immediately prior to the withdrawal of the pins O⁴ from the mercury-cells O⁵.

Figure 9:
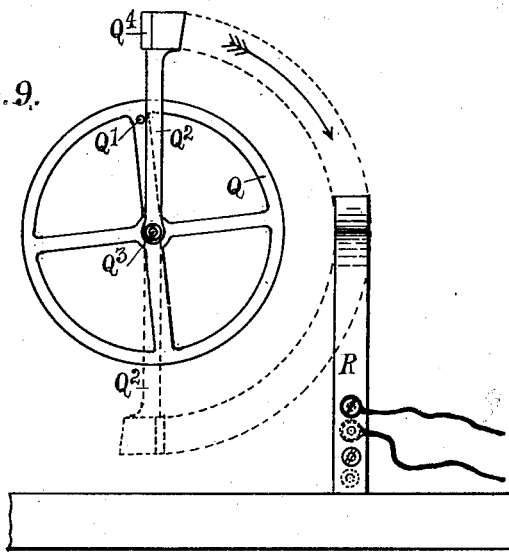
Figure 10:
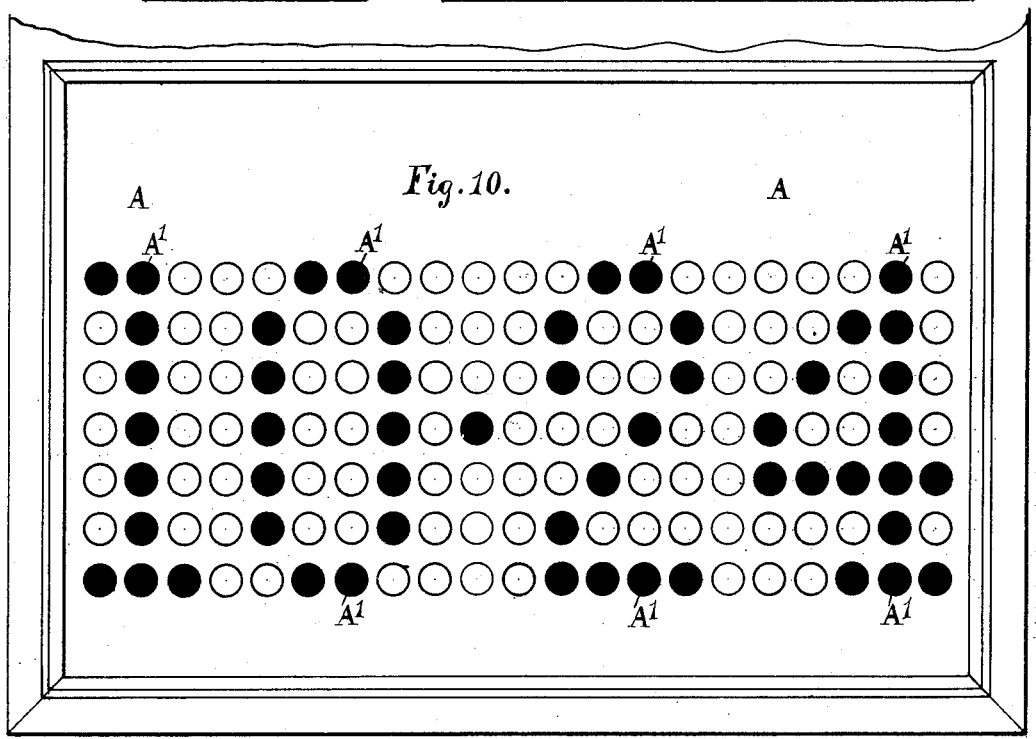

In order to automatically advance the first selecting-cylinder H at regular intervals of time—say every minute—by passing a current of electricity through the solenoid I⁵, a clock-controlled switch of the form shown in Figs. 8 and 9 may be employed. In the arrangement shown Q is a wheel which is connected to a clock, so as to be rotated, say, once every minute. This wheel is provided with a pin Q', which engages with an arm Q², which is pivoted loosely on the axis Q³ of the wheel. This arm Q² is provided with an enlarged outer end Q⁴, and when said arm has been raised by the pin Q' into the vertical position (shown in Fig. 9) it then falls into the lower position. (Shown in dotted lines.) In its fall the outer enlarged end Q⁴ passes between the two springs R R', which are insulated from each other by means of the block R², to which they are secured, and thus momentarily connects or bridges the space between the said springs.

The switch described is interposed in the main conductor, which connects the terminals S' of the solenoid I⁵ (see Fig. 1) to the electric generator, so that the said circuit is normally interrupted by the block R² between the said springs and is only closed for a very limited period by the fall of the arm Q² every minute, said springs and end Q⁴ of the arm being so disposed as to close the circuit for the length of time required for the core I⁴ of the solenoid to complete its downward movement.

If preferred, a fourth selecting-drum may be employed, said drum being advanced by a bolt in the third drum in the same manner as hereinbefore described. This selecting-drum may be employed for switching the whole of the lights out or in at the requisite time every twenty-four hours, or for indicating ante meridiem or post meridiem.

When the apparatus is used for exhibiting letters or words for advertising or like purposes, a single cylinder may be substituted for the triplicate arrangement hereinbefore described.

What I claim as my invention, and desire to cover by Letters Patent, is—

1. In apparatus for indicating the time or the like in illuminated figures, the combination with a series of spaces, of means for illuminating each space, three rotative drums, a series of selecting means on each drum, means for intermittently advancing the first drum, a catch-bolt carried by said first drum for advancing the second drum at the requisite intervals, means for controlling said bolt, a catch-bolt carried by the second drum for advancing the third, said bolt being actuated by that in the first drum at the required intervals, and connections between the selecting means on the drums and the means for illuminating each space, substantially as described.

2. In apparatus for indicating the time or the like in electrically-illuminated figures, the combination with a contact maker and breaker in the circuit of each lamp, of three rotative drums, a series of selecting means on each drum adapted to select and switch in the requisite lamps required to form or build up the figures in succession indicative of the time, means for intermittently advancing the first drum, a catch-bolt carried by the first drum for advancing the second, means for controlling said bolt, a catch-bolt carried by the second drum for advancing the third, said bolt being actuated by that in the first drum so that the said second and third drums are advanced simultaneously with the first at the termination of each period of time they respectively indicate, selecting devices having their ends in the path of the selecting means on the drums, and connections between said devices and the contact maker and breaker in the circuit of each lamp, substantially as described.

3. In apparatus for indicating the time or the like in illuminated figures, the combination with means for illuminating each space, of three rotative drums, a series of selecting-bars on each drum, mechanism for intermittently advancing the first drum, a bolt in the first drum, means for moving said bolt endwise, a toothed wheel on the second drum with which said bolt engages when moved endwise, two bolts in the second drum which are in turn moved endwise by the bolt in the first drum, a toothed wheel on the third drum with which the bolts in the second drum engage when moved endwise, and an operative connection between the selecting means on the drums and the illuminating means of each space, substantially as described.

4. In apparatus for indicating the time or the like in illuminated figures, the combination with an electric lamp in each space, of a contact maker and breaker in the circuit of each lamp provided by a mercury-cell and a pivoted lever having a pin dipping into said cell, three rotative drums to indicate units of minutes, tens of minutes, and hours respectively, a series of selecting-bars on each drum, means for intermittently advancing the first drum, a bolt in the first drum for advancing the second, bolts in the second drum for advancing the third, selecting-levers having their ends arranged in the path of the selecting-bars on the drums, and connections between said levers and the contact maker and breaker of each lamp, substantially as described.

5. In apparatus for indicating the time or the like in illuminated figures, the combination with means for independently illuminating each space, of three selecting-drums, selecting-bars on said drums, ratchet-wheel and pawl mechanism for intermittently advancing the first drum, a solenoid for actuating said mechanism, a clock-controlled switch in the solenoid-circuit for controlling the circuit on the solenoid, means for advancing the second drums at the correct time relatively to the first drum, means for advancing the third drum at the correct time relatively to the second drum, and connections between the selecting-bars and the light-controlling means of each space, substantially as described.

6. In apparatus for indicating the time or the like in illuminated figures, the combination with means for illuminating each space, of a rotative drum, a series of selecting-bars on said drum of means for intermittently advancing said drum, selecting-levers having their ends arranged in the path of the selecting-bars on the drum, a bar on which said levers are fulcrumed, a cap to hold said levers on said bar the correct distance apart, and connections between said levers and the light-controlling mechanism of each space, substantially as described.

7. In apparatus for indicating the time or the like in illuminated figures, the combination with an electric lamp in each space, of a contact maker and breaker in the circuit of each lamp, three rotative drums mounted on a common axis, ratchet-wheel and pawl mechanism for intermittently advancing the first drum, a solenoid for actuating said mechanism, a clock-controlled switch in the solenoid-circuit, a bolt in the first drum for advancing the second, means for actuating said bolt at the correct intervals, bolts in the second drum for advancing the third said bolts being actuated by the bolt in the first drum, selecting-levers having their ends arranged in the path of the selecting-bars on the drum, a bar on which said levers are fulcrumed, a cap to hold said levers on said bar the correct distance apart, a guide-bar to support the ends of said levers, and wires hooked onto the ends of said levers and held in position by the said guide-bar for connecting said levers to said contact makers and breakers, substantially as described.

In testimony whereof I have signed my name to this specification in the presence of two subscribing witnesses.

WILLIAM THOMSON BELL.

Witnesses:
F. CECIL SHELDON,
J. B. JAMSON.